United States Patent [19]

Beer et al.

[11] Patent Number: 4,972,875
[45] Date of Patent: Nov. 27, 1990

[54] HIGH PRESSURE HOSE FOR MODULAR FUEL DELIVERY SYSTEM

[75] Inventors: Robert C. Beer, Flushing; Timothy F. Coha, Davison, both of Mich.; Samuel G. Griffith, McDonald, Ohio

[73] Assignee: General Motors Corporation, Detroit, Mich.

[21] Appl. No.: 456,691

[22] Filed: Dec. 26, 1989

[51] Int. Cl.⁵ ............................................. F04B 39/14
[52] U.S. Cl. .................................. 137/590; 123/514; 137/558; 137/565; 285/239; 285/903
[58] Field of Search ............... 123/514; 137/565, 558, 137/590; 285/38, 239, 903, 921

[56] References Cited

U.S. PATENT DOCUMENTS

| | | | |
|---|---|---|---|
| 2,891,581 | 6/1959 | Roberts | 138/55 |
| 2,999,497 | 9/1961 | Hamilton et al. | 128/142 |
| 3,794,080 | 2/1974 | Huston et al. | 138/121 |
| 4,310,184 | 1/1982 | Campbell | 285/238 |
| 4,624,240 | 11/1986 | Hitch | 126/41 |
| 4,672,937 | 6/1987 | Fales et al. | 123/509 |
| 4,706,707 | 11/1987 | Betterton et al. | 137/565 |
| 4,718,568 | 1/1988 | Dal Palù | 220/86 |
| 4,747,388 | 5/1988 | Tuckey | 123/514 |
| 4,793,384 | 12/1988 | Lalikos et al. | 138/121 |

Primary Examiner—Gerald A. Michalsky
Attorney, Agent, or Firm—Saul Schwartz

[57] ABSTRACT

A high pressure fuel hose for disposition between a tubular stem on a fluid connector on a canister in a fuel tank and tubular stem on a fluid connector on a cover for the fuel tank spaced from the canister. Each of the tubular stems has a fir-tree barb thereon and the high pressure hose includes a convoluted flexible body and a pair of relatively stiff cylindrical ends each of which has a pair of annular inside beads and three annular outside beads between the convoluted body and the inside beads. When the cylindrical ends are press fitted over the fir-tree barbs with force applied at the outside beads, the inside bead seat behind annular shoulders on the barbs for enhanced retention.

2 Claims, 2 Drawing Sheets

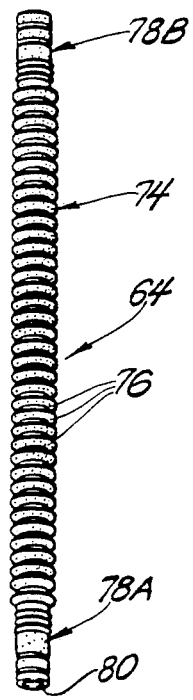
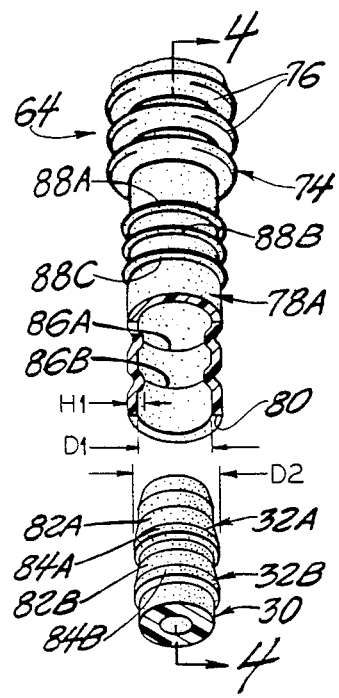
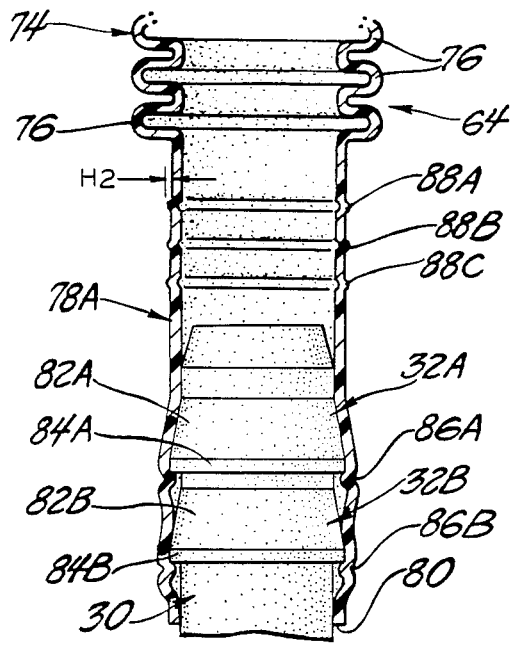

HIGH PRESSURE HOSE FOR MODULAR FUEL DELIVERY SYSTEM

FIELD OF THE INVENTION

This invention relates to high pressure hoses for modular fuel delivery systems on automobile fuel tanks.

BACKGROUND OF THE INVENTION

Manufacturing economies are achieved by grouping several functionally related components into a module which is handled and installed as a unit. In automotive fuel systems, for example, modular fuel delivery systems have been proposed for direct installation on a fuel tank. Such systems are typically inserted through a hole in the top of the fuel tank and usually include a reservoir canister, a pump in the canister, a cover for the hole in the tank, elements for attaching the canister to the cover, and a flexible high pressure hose for conducting high pressure fuel from the pump to a fluid connector on the cover. The high pressure hose may be rubber or flexible plastic and is usually provided with a loop section to accommodate thermal and pressure induced expansion and shrinkage of the gap between the canister and the cover. The ends of the high pressure hose are typically pushed over tubular stems of fluid connectors and retained either by the natural resilience of the hose gripping annular fir-tree or similar barbs on the stems or by hose clamps around the outside of the hose. A high pressure hose according to this invention includes structural features at its ends which minimize the difficulty of pushing the ends over the tubular stems and which maximize resistance to dislodgment of the ends from the stems.

SUMMARY OF THE INVENTION

This invention is a new and improved high pressure hose between a pump in a canister of a modular fuel delivery system on an automobile fuel tank and a cover closing an access hole in the tank. The high pressure hose according to this invention is made of fuel resistant, blow-moldable elastomer, preferably a commonly available material such as NYLON 11, and includes a flexible body characterized by a plurality of annular sinusoidal convolutions, a pair of relatively stiff non-convoluted cylindrical ends, a pair of inside annular beads on each cylindrical end, and a plurality of outside annular beads on each cylindrical end. The inside beads on each cylindrical end are pushed over and cooperate with annular fir-tree barbs on tubular stems of fluid connectors to maximize resistance to dislodgment of the cylindrical ends from the stems. The outside beads on the cylindrical ends define convenient abutments whereat the cylindrical ends can be engaged without radial distortion by pushing implements required to push the relatively stiff cylindrical ends and inside beads over the fir-tree barbs. In a preferred embodiment of the high pressure hose according to this invention, the inside beads have radial heights not exceeding about 4.5% of the diameter of the cylindrical ends of the hose and the outside beads have similar radial heights of not less than about 4.5% of the diameter of the cylindrical ends of the hose.

BRIEF DESCRIPTION OF THE DRAWINGS

FIG. 2 is a perspective view of a high pressure hose according to this invention;

FIG. 3 is an exploded perspective view of a connection between a high pressure hose according to this invention and a tubular stem of a fluid connector; and FIG. 4 is a sectional view taken generally along the plane indicated by lines 4—4 in FIG. 3 and showing the tubular stem in place relative to the high pressure hose according to this invention.

DESCRIPTION OF A PREFERRED EMBODIMENT

Figure 1:
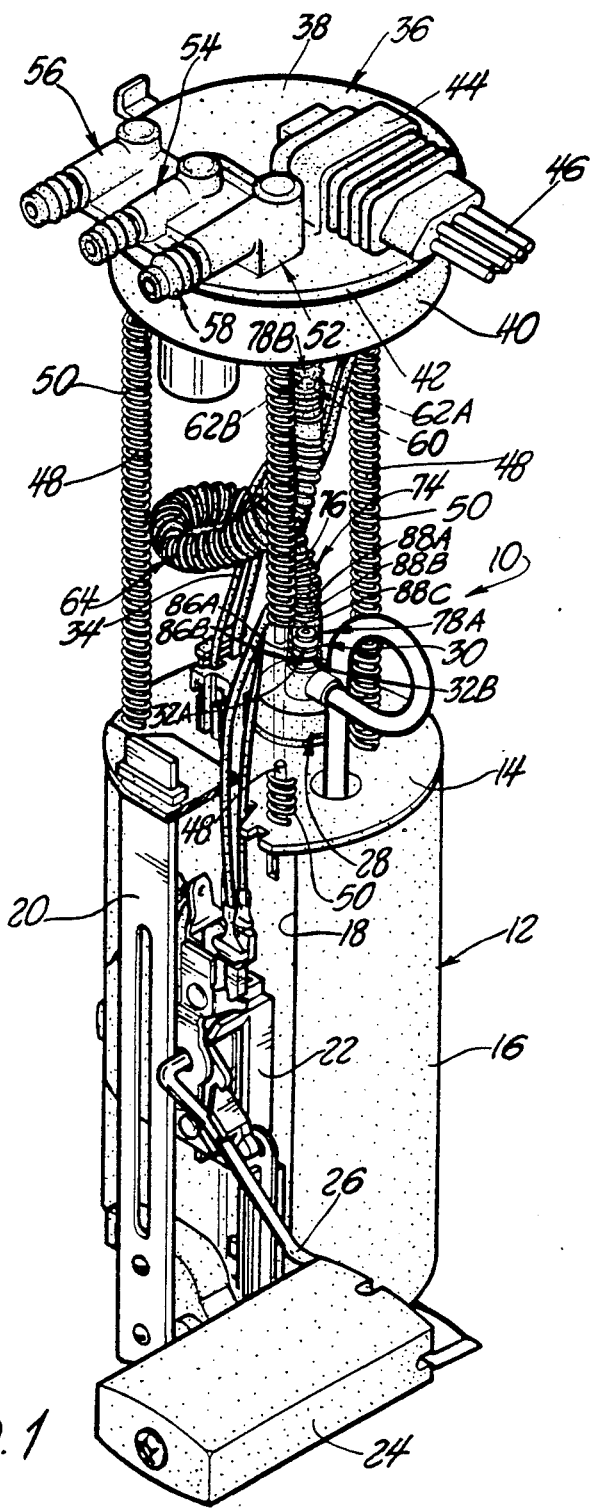
FIG. 1 is a perspective view of a modular fuel delivery system having a high pressure hose according to this invention.

As seen best in FIG. 1, a modular fuel delivery system 10 includes a reservoir canister 12 having a top 14 and a cylindrical wall 16 with a flat side 18. A metal bracket 20 is rigidly attached to the reservoir 12 parallel to the flat side 18. A fuel level transducer 22 is rigidly attached to the bracket 20 between the latter and the flat side 18 and includes a float 24 on an arm 26 which pivots with changes in the surface level of the fuel in a tank, not shown, on which the fuel delivery system 10 is installed.

A fluid connector 28 having a tubular stem 30 is attached to the top 14 of the canister 12. The tubular stem 30 has a pair of fir-tree barbs 32A–B thereon, FIGS. 1, 3 and 4. The discharge port of a conventional electric fuel pump, not shown, in the canister 12 communicates with the stem 30 below the top 14. The electric pump is connected to the electrical system of an automobile on which the fuel delivery system is mounted through an in-tank portion 34 of the wiring harness of the vehicle. When the ignition of the vehicle is switched on, the pump delivers high pressure fuel to the stem.

The fuel delivery system 10 further includes a cover 36 for closing a hole in a top wall, not shown, of the fuel tank. The cover 36 is a flat plastic disc having a upper or exposed surface 38, a lower or inside surface, not shown, facing the canister 12, and an integral depending flange 40. The disc has an annular shoulder 42 radially outboard of the depending flange which seats against a seal, not shown, on the top wall of the tank around the access hole. Conventional means, not shown, clamp the cover 36 to the top wall of the tank. The cover has a molded-in or otherwise sealingly attached electrical connector 44 which defines a junction between the in-tank portion 34 of the wiring harness and an outside portion 46 of the wiring harness.

The cover 36 is connected to the canister 12 by a plurality of identical hollow struts 48. Each strut has an upper end press fitted into a socket, not shown, in the cover 36 and a lower end telescopically received in a cylindrical bore in the top 14 of the canister. A plurality of coil springs 50 are disposed around respective ones of the struts and urge relative separation between the cover and the canister. Stops, not shown, at the lower ends of the struts 48 limit the relative separation between the canister and the cover. The springs maintain the canister 12 in contact with the bottom of the fuel tank so that the fuel level signal from the transducer 22 is bottom referenced.

The cover 36 has a plurality of molded-in fluid connectors including a high pressure connector 52, a vapor connector 54, and a low pressure or return fuel connector 56. On the exposed surface 38 of the cover, the high pressure connector includes an outside tubular stem 58 on which are formed a plurality of annular fir-tree barbs. The outside stem 58 receives the end of a fuel hose, not shown, through which high pressure fuel is directed to the engine of the vehicle. Below the inside surface of the cover 36, the high pressure connector 52 includes an inside tubular stem 60 on which are formed a pair of annular fir-tree barbs 62A-B. A high pressure hose 64 according to this invention is disposed between the stem 30 of the connector 28 on the canister top 14 and the inside tubular stem 60 of the high pressure connector 52 on the cover 36.

The high pressure hose 64 according to this invention includes a tubular body 74 characterized by a plurality of annular sinusoidal convolutions 76 and a pair of integral, relatively inflexible cylindrical ends 78A-B. The high pressure hose 64 is blow molded from fuel resistant plastic, preferably a commonly available material such as NYLON 11. NYLON 11 is commercially available from ATOCHEM, Inc., Glen Rock, New Jersey. Non-convoluted hoses made of NYLON 11 have been used in the past as high pressure hoses in automotive fuel systems. In addition, both longitudinally split and unsplit convoluted hoses made of NYLON have been used by Packard Electric Division, General Motors Corporation, in automobile wiring harnesses to protect bundles of wires inside the hoses.

The cylindrical end 78A and its connection to the tubular stem 30 of the connector 28 is representative of both cylindrical ends of the high pressure hose and has a circular end 80 having a diameter D1, FIG. 3. Each of the fir-tree barbs 32A-B on the tubular stem 30 of the connector 28 has a tapered or frustoconical wall 82A-B leading to an annular shoulder 84A-B around the stem having an outside diameter D2, FIG. 3, exceeding diameter D1.

As seen best in FIGS. 2–4, the cylindrical end 78A is inwardly indented to define a pair of annular inside beads 86A-B near the circular end 80 thereof. The beads 86A-B are axially spaced a distance corresponding to the spacing between the annular shoulders 84A-B on the tubular stem 30. Each bead 86A-B has a radial height H1, FIG. 3, not exceeding about 4.5% of the diameter D1 of the circular end 80. Inside beads of this general dimension have been found to afford acceptable retention on a NYLON 11 high pressure hose having a cylindrical end with D1 equal to about 8.05mm.

The cylindrical end 78A is outwardly indented to define three annular outside beads 88A,B,C between the body 74 of the high pressure hose and the inside beads 86A-B. Each outside bead 88A-C has a radial height H2 not less than about 4.5% of the diameter D1 of the cylindrical end 78A. Outside beads of this general dimension have been found to provide acceptable abutments for press fitting cylindrical ends with D1 equal to about 8.05mm on fir-tree barbs with D2 equal to about 10.96mm.

The high pressure hose 64 is looped between the tubular stems 30 and 60 to accommodate thermal or pressure induced expansion and shrinkage of the gap between the canister 12 and the cover 36. The radial height H1 of the inside beads 86A-B is an important feature of this invention because it increases the retention of the cylindrical end 78A of the high pressure hose 64 on the tubular stem 30. In a preferred embodiment of the high pressure hose 64, the inside diameter D1 of the hose is about 2.91mm smaller than the outside diameter D2 of the annular shoulders 84A-B. This amount of interference between the hose and the stem permits the relatively stiff cylindrical end to be pushed over the fir-tree barbs without collapsing the cylindrical end. The retention afforded by the interference alone, however, is not sufficient for high pressure applications where fuel pressure is on the order of 160 psi. Under that condition, the inside beads 86A-B afford additional retention sufficient for the higher pressures.

The inside beads 86A-B incrementally increase the force required to push the cylindrical end 76A over the fir-tree barbs 32A-B on the tubular stem 30 to levels beyond manual capability. The annular outside beads 88A-C define abutments on the cylindrical end suitable for engagement by any convenient vice-like fixture, not shown, whereat axial force is applied to the cylindrical end 78A between the convoluted body 74 and the inside beads 86A-B. Because the outside beads stand above the outside surface of the cylindrical end 78A, indenting or gouging or otherwise radially deforming the cylindrical end is not required for press fitting the cylindrical end on the tubular stem 30.

The embodiments of the invention in which an exclusive property or privilege is claimed are defined as follows:

1. In a modular fuel delivery system including
    a canister with a fluid connector thereon having a first tubular stem including a fir-tree barb having an annular shoulder with a first outside diameter, and
    a cover connected to said canister and spaced therefrom by a variable gap and having a high pressure fluid connector thereon including a second tubular stem having a fir-tree barb having an annular shoulder with said first outside diameter,
    a high pressure blow-molded elastomeric hose comprising:
    a flexible body having a plurality of annular sinusoidal convolutions,
    a pair of integral cylindrical ends at opposite ends of said body each having a second diameter less than said first diameter and each adapted for press fit engagement on said fir-tree barb on a respective one of said first and said second tubular stems,
    means on each of said cylindrical ends defining an annular inside bead for engagement behind said annular shoulder on said respective one of said fir-tree barb for increased retention of said cylindrical ends on said first and said second tubular stems, and
    means on each of said cylindrical ends defining an annular outside bead between convoluted body and said annular inside bead whereat force is applied to press fit each of said cylindrical ends on respective ones of said first and said second tubular stems.

2. The high pressure hose recited in claim 1 wherein said inside annular bead has a radial height not exceeding about 4.5% of said second diameter, and said outside annular bead has a radial height not less than about 4.5% of said second diameter.

* * * * *